(12) United States Patent
Takeuchi

(10) Patent No.: US 11,362,423 B2
(45) Date of Patent: Jun. 14, 2022

(54) NON-CONTACT TYPE INFORMATION PROCESSING DEVICE

(71) Applicant: NIDEC SANKYO CORPORATION, Nagano (JP)

(72) Inventor: Junro Takeuchi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/038,238

(22) Filed: Sep. 30, 2020

(65) Prior Publication Data

US 2021/0098879 A1  Apr. 1, 2021

(30) Foreign Application Priority Data

Sep. 30, 2019  (JP) .............................. JP2019-178517

(51) Int. Cl.

| | | |
|---|---|---|
| *H01Q 1/24* | (2006.01) | |
| *H01Q 7/00* | (2006.01) | |
| *G06K 7/10* | (2006.01) | |
| *G06K 19/077* | (2006.01) | |
| *H01Q 1/22* | (2006.01) | |

(52) U.S. Cl.
CPC ........... *H01Q 7/00* (2013.01); *G06K 7/10336* (2013.01); *G06K 19/07749* (2013.01); *H01Q 1/2225* (2013.01)

(58) Field of Classification Search
CPC ........... G06K 19/07749; G06K 7/0004; G06K 7/0013; G06K 7/08; G06K 7/10336; G06K 7/10356; H01Q 1/2225; H01Q 7/00; H04B 5/0025; H04B 5/0081
See application file for complete search history.

(56) References Cited

U.S. PATENT DOCUMENTS

| | | | | |
|---|---|---|---|---|
| 2007/0257799 | A1* | 11/2007 | Bauchot ........... | G06K 19/07749 340/572.1 |
| 2014/0158768 | A1* | 6/2014 | Ray ....................... | H04K 3/825 235/449 |
| 2014/0246504 | A1* | 9/2014 | Ikemoto ........... | G06K 19/07794 235/492 |
| 2019/0025791 | A1* | 1/2019 | Walker ................. | G05B 19/056 |
| 2019/0036380 | A1* | 1/2019 | Garrity .................. | H02J 50/12 |
| 2019/0130239 | A1* | 5/2019 | Kimura ............. | G06K 19/0776 |
| 2019/0213460 | A1* | 7/2019 | Finkenzeller .... | G06K 19/07773 |

FOREIGN PATENT DOCUMENTS

JP        2010256950 A     11/2010

* cited by examiner

*Primary Examiner* — Thien M Le
(74) *Attorney, Agent, or Firm* — Cantor Colburn LLP

(57) ABSTRACT

A non-contact type information processing device structured to communicate with a medium in a non-contact manner may include a first circuit part having a first antenna, and the first circuit part may be configured to communicate with the medium at a first resonance frequency by electromagnetic induction. The non-contact type information processing device may further include a second circuit part having a second resonance frequency which is separated from the first resonance frequency, and the second circuit part may include a second antenna and a light emitting element which is operated by electric power obtained by an induced current that is received by the second antenna.

11 Claims, 2 Drawing Sheets

NON-CONTACT TYPE INFORMATION PROCESSING DEVICE

CROSS REFERENCE TO RELATED APPLICATION

The present invention claims priority under 35 U.S.C. § 119 to Japanese Application No. 2019-178517 filed Sep. 30, 2019, and the entire content of which is incorporated herein by reference.

TECHNICAL FIELD

At least an embodiment of the present invention may relate to a non-contact type information processing device structured to perform communication with a medium such as a smart phone provided with short-range wireless communication (NFC; Near Field Communication) function and a non-contact type IC (integrated circuit) card by electromagnetic induction.

BACKGROUND

A non-contact type information processing device such as a non-contact type IC card reader has been known, the non-contact type information processing device being structured so that communication is performed with a medium such as a smart phone provided with NFC function and a non-contact type IC card, and reading and writing of data are performed to the medium. The medium incorporates an IC and a memory, but the medium is not provided with a power source and thus, the non-contact type information processing device supplies electric power to the medium by utilizing electromagnetic induction based on resonance frequency characteristics between the non-contact type information processing device and the medium. An IC provided within the medium is operated by the electric power, and communication is performed by electromagnetic induction with the medium in an operated state and data are transmitted and received. In this case, in order that a user is capable of recognizing whether or not the non-contact type information processing device is in a state capable of communicating with the medium, a technique may be often utilized that an LED (light emitting diode) or a buzzer is provided in the non-contact type information processing device to confirm it by visual observation of light emission of the LED or by sound recognition using the buzzer. However, in order to confirm an operating state of the non-contact type information processing device by using an LED or a buzzer, a power source for driving the LED or the buzzer is required to be prepared. As an example which does not require a power source, Japanese Patent Laid-Open No. 2010-256950 (Patent Literature 1) discloses that, in order to detect whether an antenna provided in a non-contact type information processing device is capable of operating or not, a detection means is used which includes a detection antenna which detects an electromagnetic wave generated from the antenna of the non-contact type information processing device, a rectifier circuit which rectifies an electric current obtained by the detection antenna, and an LED which is driven by a direct current obtained by the rectifier circuit. The detection means is arranged in a conveying passage of the non-contact type information processing device where a card-shaped medium is to be conveyed.

In the non-contact type information processing device disclosed in Patent Literature 1, in a case that the detection means is provided, communication between the non-contact type information processing device and a medium may be affected.

SUMMARY

In view of the problem described above, at least an embodiment of the present invention may advantageously provide a non-contact type information processing device which is capable of indicating an operating state by a light emitting element without affecting communication with a medium and without preparing a power source.

According to at least an embodiment of the present invention, there may be provided a non-contact type information processing device which is structured to communicate with a medium in a non-contact manner, and the non-contact type information processing device includes a first circuit part having a first antenna, the first circuit part being configured to communicate with the medium at a first resonance frequency by electromagnetic induction, and a second circuit part having a second resonance frequency which is separated from the first resonance frequency. The second circuit part may include a second antenna and a light emitting element which is operated by electric power obtained by an induced current that is received by the second antenna.

In at least an embodiment of the present invention, a light emitting element may be operated by electric power obtained by an induced current which is received by the second antenna. Therefore, a communication state of the non-contact type information processing device can be indicated by the light emitting element without providing a power source. Further, the second resonance frequency may be separated from the first resonance frequency and thus, a communication state of the non-contact type information processing device can be indicated by the light emitting element without affecting communication with a medium.

In at least an embodiment of the present invention, the non-contact type information processing device may be structured so that the first antenna and the second antenna may be formed on the same wiring circuit board. Since the first antenna and the second antenna are formed on the same wiring circuit board, the first antenna and the second antenna can be simultaneously formed, for example, by using a printed circuit board manufacturing technique.

In at least an embodiment of the present invention, the non-contact type information processing device may further include an insertion port into which at least one of a magnetic card and a contact type IC card is inserted, and a bezel which is formed around the insertion port, and the first antenna and the second antenna may be provided in an inside of the bezel. In such a non-contact type information processing device, for example, in a case that reading of data from a magnetic card is to be performed, or reading and writing of data to a contact type IC card are to be performed, the card is inserted through the insertion port. Further, in a case that reading and writing of data to a medium such as a non-contact type IC card and a smart phone having NFC function are to be performed, the medium may be held over the bezel without being inserted through the insertion port. Since the first antenna and the second antenna are arranged in an inside of the bezel, a distance between a medium such as a non-contact type IC card and the first antenna can be reduced sufficiently.

In a case that a bezel is provided so as to surround the insertion port, each of the first antenna and the second antenna may be structured of a loop antenna which is formed so as to surround the insertion port. According to this structure, both of the first antenna and the second antenna may be formed to be wound around the insertion port and thus, a sufficient induced current is obtained by the second antenna. In a case that a bezel is provided, a light emitting element can be provided in the bezel so as to exhibit outward appearance of the bezel as if the bezel itself emits light. When outward appearance as if the bezel itself emits light is obtained, indication of a communication state of the non-contact type information processing device can be visually confirmed easily.

In the non-contact type information processing device in at least an embodiment of the present invention, the second circuit part may further include a control part configured to control light emission of the light emitting element. When the control part is provided in the second circuit part, various light emissions can be realized.

Effects of the Invention

According to at least an embodiment of the present invention, a communication state of the non-contact type information processing device can be indicated by the light emitting element without affecting communication with a medium and without preparing a power source.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and in which like elements are numbered alike in several drawing figures, in which.

DETAILED DESCRIPTION

Figure 1:
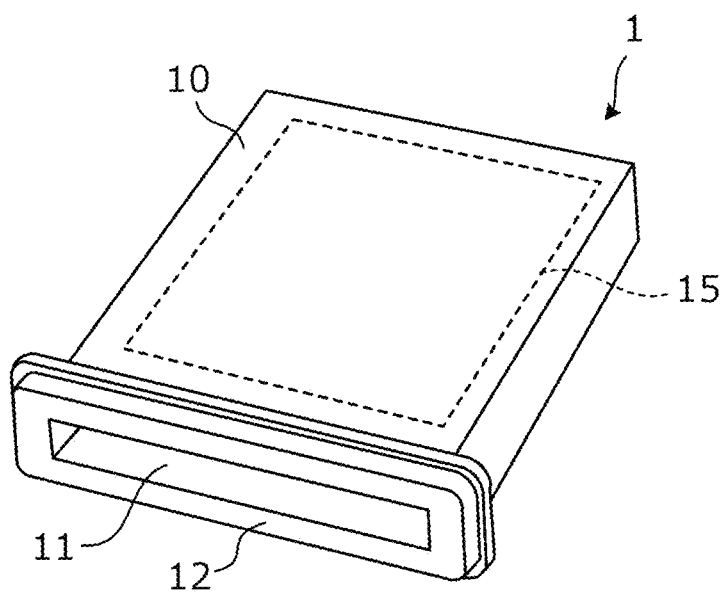
FIG. 1 is a schematic perspective view showing a non-contact type information processing device in accordance with an embodiment of the present invention.

A preferred embodiment of the present invention will be described below with reference to the accompanying drawings. FIG. 1 shows an outward appearance of a non-contact type information processing device in accordance with an embodiment of the present invention. In the following descriptions, an object which is capable of reading and writing data in a non-contact state by using electromagnetic induction, for example, a smart phone having NFC function or a non-contact type IC card, is defined as a medium. The non-contact type information processing device 1 is a device which is structured to read and write data to a medium in a non-contact manner and, in addition, the device 1 is capable of reading data from a magnetic card and is capable of reading and writing data to a contact type IC card. One side face of a housing 10 of the non-contact type information processing device 1 is provided with an insertion port 11 in a slot shape into which a magnetic card or a contact type IC card is to be inserted, and a bezel 12 is formed around the insertion port 11. As described below, a loop antenna 23 used in communication with a medium such as a non-contact type IC card is provided in an inside of the bezel 12, and reading and writing of data to the medium are performed by lightly touching the medium to the bezel 12 or by causing the medium to approach to the bezel 12. On the other hand, when reading of data from a magnetic card is to be performed or, when reading and writing of data to a contact type IC card are to be performed, the card is inserted into an inside of the housing 10 through the insertion port 11. The inside of the housing 10 is provided with a circuit board 15 on which a circuit configured to process reading and writing of data is mounted as shown by the broken line in FIG. 1.

Figure 2:
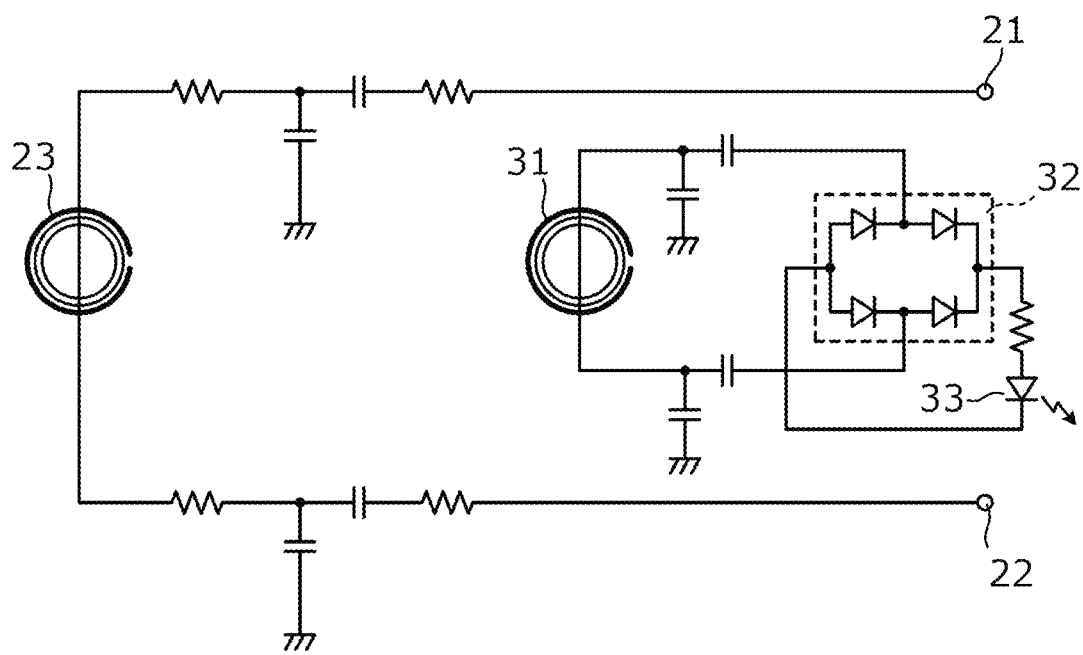
FIG. 2 is a circuit diagram showing a circuit which is incorporated in an inside of a bezel.

FIG. 2 shows a part of a circuit configuration of the non-contact type information processing device 1 in accordance with an embodiment of the present invention. In FIG. 2, a circuit portion which is incorporated in an inside of the bezel 12 is shown. The circuit shown in the drawing is, when roughly divided, structured of a first circuit part comprised of terminals 21 and 22 and a loop antenna 23, and a second circuit part comprised of a loop antenna 31, a rectifier circuit 32 and an LED (light emitting diode) 33. The first circuit part is configured to communicate with a medium at a first resonance frequency by electromagnetic induction, and the first circuit part is connected with a transmitting and receiving circuit not shown which is provided in the wiring circuit board 15 in an inside of the housing 10 through the terminals 21 and 22. The terminals 21 and 22 are connected with both ends of the loop antenna 23.

On the other hand, the second circuit part is provided for indicating a communication state of the first circuit part in the non-contact type information processing device 1 and has a second resonance frequency which is separated from the first resonance frequency. The loop antenna 31 which is the second antenna is disposed so as to be capable of receiving an induced current from the loop antenna 23 of the first circuit part. Both ends of the loop antenna 31 are connected with inputs of the rectifier circuit 32, and the rectifier circuit 32 converts the induced current which is received by the loop antenna 31 into DC power and outputs the DC power. The LED 33 is connected with an output of the rectifier circuit 34. One LED 33 is provided in FIG. 2, but a plurality of LEDs 33 may be arranged in parallel to each other with respect to the output of the rectifier circuit 34.

In the non-contact type information processing device 1, the loop antenna 23 of the first circuit part is used when reading and writing of data to a medium are performed by electromagnetic induction. In this case, an induced current from the loop antenna 23 is received by the loop antenna 31 of the second circuit part, and the induced current received by the loop antenna 31 is converted into DC power by the rectifier circuit 32 and is supplied to the LED 33. As a result, the LED 33 which is a light emitting element always emits light in a state that the loop antenna 23 of the first circuit part is capable of performing communication, in other words, when the non-contact type information processing device 1 is in a communication state.

A relationship between the first resonance frequency and the second resonance frequency will be described below. In this embodiment, an induced current from the loop antenna 23 of the first circuit part is received by the loop antenna 21 of the second circuit part and thereby the LED 33 emits light. In this case, it is required that light emission of the LED 33 does not affect communication between the first circuit part and a medium such as a non-contact type IC card. Therefore, the second resonance frequency is set to a frequency which is sufficiently separated from the first resonance frequency so as not to affect communication with a medium. When an appropriate frequency difference is set, the LED 33 can be made to emit light without affecting a communication characteristic with a medium.

Figure 3:
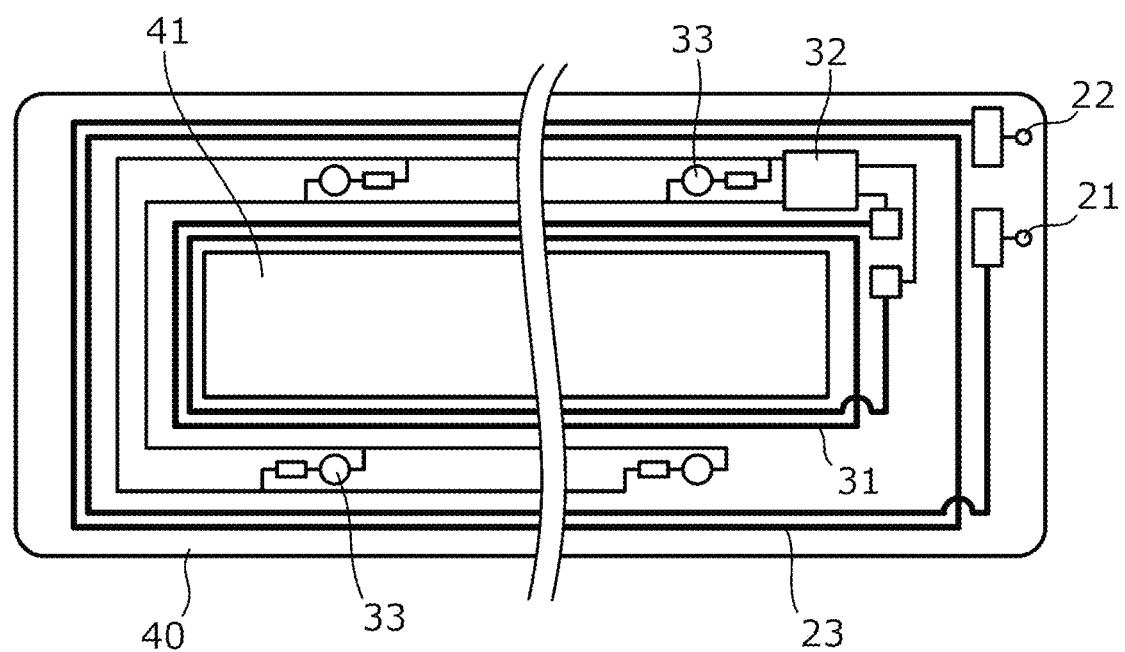
FIG. 3 is a plan view showing a wiring circuit board which is provided in the bezel.

Next, a circuit arrangement in the inside of the bezel 12 will be described below. The loop antennas 23 and 31 are commonly formed on a wiring circuit board by using a printed circuit forming technique. FIG. 3 is a plan view showing a wiring circuit board 40 which is disposed in the inside of the bezel 12. FIG. 3 shows arrangement of various components on the wiring circuit board 40, and arrangement and shapes of wiring patterns including the loop antennas 23 and 31 are also shown. The bezel 12 is provided so as to surround the insertion port 11 which is provided in the housing 10 of the non-contact type information processing device 1 and thus, the wiring circuit board 40 is formed in a long and narrow rectangular shape which has a long and narrow opening 41 corresponding to the insertion port 11. The wiring circuit board 40 is provided with each of the loop antennas 23 and 31 so as to go around the opening 41. The loop antennas 23 and 31 are provided so as to go around the same opening 41 on the same wiring circuit board 40 and thus, the loop antenna 31 of the second circuit part is capable of receiving an induced current strongly from the loop antenna 23 of the first circuit part. In order to prevent affecting a communication characteristic to a medium, the loop antennas 23 and 31 are arranged separately from each other as much as possible and thus, the loop antenna 23 of the first circuit part is formed so as to be closer to each side of an outer periphery of the wiring circuit board 40, and the loop antenna 31 of the second circuit part is formed so as to go along edges of the opening 41 as much as possible. The wiring circuit board 40 is also provided with terminals 21 and 22, the rectifier circuit 32 and the LED 33. Especially, in an example shown in FIG. 3, a plurality of LEDs 33 is connected in parallel to each other with respect to an output of the rectifier circuit 32.

The bezel 12 is, for example, structured of milky-white translucent synthetic resin and lights from the LEDs 33 are emitted outside as diffused light through the bezel 12. As a result, when the LEDs 33 emit lights, outward appearance of the bezel 12 can be obtained as if the whole bezel 12 shines. In addition, in this embodiment, it may be structured that a control part configured to change a light emission mode of the LED 33 is provided in the second circuit part. In a case that the control part is provided, power supply to the control part is performed through the rectifier circuit 34. Light emission modes which can be changed by the control part may include whether the LED emits light in a blinking manner or not, when a plurality of LEDs 33 is arranged, the number of the LEDs which are simultaneously emitted is changed or, when LEDs 33 having different light-emission colors are provided, light-emission colors are sequentially changed.

According to the non-contact type information processing device 1 in this embodiment described above, a user can be recognized whether the loop antenna 23 used in communication with a medium is operating normally or not without preparing a power source by confirming light emission of the LED 33 through visual observation. The loop antenna 23 is provided in the inside of the bezel 12 which is provided so as to surround the insertion port 11. Therefore, a medium configured to perform reading and writing data in a non-contact manner is not limited to a card-shaped object and an object in an arbitrary shape can be used. Further, when a plurality of the LEDs 33 emit lights, the bezel 12 exhibits outward appearance as if the entire bezel 12 emits light and thus, visibility for a user is enhanced. Further, it is also easy to change light emission intensity of the LED 33 according to magnitude of energy inputted to the loop antenna 23 and thus, electric power situation of the loop antenna 23 can be also judged easily. Further, the LED 33 emits light when the loop antenna 23 is operated and thus, a user is capable of easily noticing timing of bringing a user's medium close to the bezel 12 for data communication. Media which can be utilized in this embodiment include a non-contact type IC card, a smart phone having NFC function, a wrist watch type terminal having NFC function, a portable game machine having NFC function, and the like.

The non-contact type information processing device according to the present invention can be utilized in various fields in which data transmission and reception is required in a non-contact manner with a medium such as a non-contact type IC card and a smart phone having NFC function. Especially, when a control part for changing a light emission mode of the LED 33 is provided, especially when the non-contact type information processing device is used for amusement or gaming, its performance effect can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A non-contact type information processing device structured to communicate with a medium in a non-contact manner and structured to be connectable with at least one of a magnetic card and a contact-type IC (integrated circuit) card, the non-contact type information processing device comprising:
   a first circuit part comprising a first antenna, the first circuit part being configured to communicate with the medium at a first resonance frequency by electromagnetic induction;
   a second circuit part having a second resonance frequency which is separated from the first resonance frequency; and
   an insertion port into which the at least one of the magnetic card and the contact-type IC card is inserted,
   wherein the second circuit part comprises a second antenna and a light emitting element which is operated by electric power obtained by an induced current that is received by the second antenna, and
   wherein the first antenna and the second antenna are both loop antennas formed to enclose the insertion port.

2. The non-contact type information processing device according to claim 1, wherein the first antenna and the second antenna are formed on a same wiring circuit board.

3. The non-contact type information processing device according to claim 2, further comprising:
   a bezel which is formed around the insertion port,
   wherein the first antenna and the second antenna are provided in an inside of the bezel.

4. The non-contact type information processing device according to claim 3, wherein each of the first antenna and the second antenna is a loop antenna which is formed so as to surround the insertion port.

5. The non-contact type information processing device according to claim 4, wherein the light emitting element is provided in the bezel so as to exhibit outward appearance of the bezel as if the bezel emits light.

6. The non-contact type information processing device according to claim 5, wherein the second circuit part further comprises a control part configured to control light emission of the light emitting element.

7. The non-contact type information processing device according to claim 1, further comprising:
a bezel which is formed around the insertion port,
wherein the first antenna and the second antenna are provided in an inside of the bezel.

8. The non-contact type information processing device according to claim 7, wherein the light emitting element is provided in the bezel so as to exhibit outward appearance of the bezel as if the bezel emits light.

9. The non-contact type information processing device according to claim 8, wherein the bezel is made of a translucent synthetic resin of milky white color, and the light from the light emitting element is emitted to the outside as diffused light through the bezel.

10. The non-contact type information processing device according to claim 1, wherein the second circuit part further comprises a control part configured to control light emission of the light emitting element.

11. The non-contact type information processing device according to claim 1, wherein the plurality of light emitting elements are arranged between the first antenna and the second antenna so as to surround the insertion port.

* * * * *